United States Patent [19]

Lisy

[11] Patent Number: 5,202,832
[45] Date of Patent: Apr. 13, 1993

[54] MATERIAL HANDLING AUTOMATION SYSTEM USING PORTABLE TRANSFER MODULE

[75] Inventor: Donald J. Lisy, Downers Grove, Ill.
[73] Assignee: R. R. Donnelley & Sons Co., Lisle, Ill.
[21] Appl. No.: 647,146
[22] Filed: Jan. 29, 1991
[51] Int. Cl.⁵ .................. G06F 15/50; B65G 67/02
[52] U.S. Cl. .................... 364/424.02; 364/456; 414/343; 414/351
[58] Field of Search ............. 364/424.01, 424.02, 364/444, 449, 456, 460, 443; 318/587; 180/167, 168, 169; 414/351, 352, 374, 279; 356/1

[56] References Cited

U.S. PATENT DOCUMENTS

| | | | |
|---|---|---|---|
| 3,779,403 | 12/1973 | Young | 414/279 |
| 3,973,685 | 8/1976 | Loomer | 414/273 |
| 3,978,995 | 9/1976 | Zollinger et al. | 414/279 |
| 4,190,013 | 2/1980 | Otis et al. | 114/263 |
| 4,286,911 | 9/1981 | Benjamin | 414/273 |
| 4,309,758 | 1/1982 | Halsall et al. | 364/424.02 |
| 4,369,563 | 1/1983 | Williamson | 29/568 |
| 4,383,789 | 5/1983 | Takamatsu | 414/277 |
| 4,523,887 | 6/1985 | Reiff | 414/664 |
| 4,560,032 | 1/1986 | Hirooka et al. | 358/103 |
| 4,623,032 | 11/1986 | Kemmer | 180/169 |
| 4,643,628 | 2/1987 | Pini | 414/279 |
| 4,647,784 | 3/1987 | Stephens | 356/1 |
| 4,669,390 | 6/1987 | Bisiach | 104/248 |
| 4,691,385 | 9/1987 | Tupman | 455/607 |
| 4,697,239 | 9/1987 | Sicard et al. | 364/468 |
| 4,700,301 | 10/1987 | Dyke | 364/456 |
| 4,702,661 | 10/1987 | Bisiach | 414/460 |
| 4,752,176 | 6/1988 | Linder | 414/278 |
| 4,773,807 | 9/1988 | Kroll et al. | 414/282 |
| 4,792,995 | 12/1988 | Harding | 455/606 |
| 4,796,198 | 1/1989 | Boultinghouse et al. | 364/51 B |
| 4,811,228 | 3/1989 | Hyyppa | 364/424.02 |
| 4,817,000 | 3/1989 | Eberhardt | 364/424.02 |
| 4,820,041 | 4/1989 | Davidson et al. | 180/168 |
| 4,918,607 | 4/1990 | Wible | 364/449 |
| 4,950,118 | 8/1990 | Mueller et al. | 180/167 |
| 4,994,970 | 2/1991 | Noji et al. | 364/424.02 |

OTHER PUBLICATIONS

*Design News* Article—"Machine Vision System Follows Landmarks"—Jul. 23, 1990, pp. 120–121.
*Managing Automation* Article—"Is Off-Wire AGV Guidance Alive or Dead"—May 1990, pp. 38–40.

Primary Examiner—Parshotam S. Lall
Assistant Examiner—Michael Zanelli
Attorney, Agent, or Firm—Wood, Phillips, VanSanten, Hoffman & Ertel

[57] ABSTRACT

A warehouse material handling automation system is disclosed which includes a portable module (22) with which to load and unload material onto and off of an automatic guided vehicle (14). The system operates such that the automatic guided vehicle (14) can calculate its position relative to a destination and follow a route to the destination. In addition, the system operates even when the portable module (22) is displaced or moved from its original position to establish a new destination.

21 Claims, 3 Drawing Sheets

MATERIAL HANDLING AUTOMATION SYSTEM USING PORTABLE TRANSFER MODULE

FIELD OF THE INVENTION

This invention relates generally to the field of warehouse automation through the use of unmanned automatic guided vehicles (AGVs) and, more particularly, to a system for loading and unloading which includes utilization of a portable load/unload station used in conjunction with an automatic guided vehicle.

BACKGROUND OF THE INVENTION

Warehouses can be automated through the use of AGVs that facilitate the transportation of materials. Such vehicles are often computer controlled to deliver materials between designated locations. The vehicles can navigate by following a wire embedded in the ground which emits a radio frequency signal on which the vehicles can be moved between fixed areas (load/unload stations) on a fixed route. However, it is more desirable to have vehicles with flexible, alternate routes which enable the vehicles to be routed around obstacles, such as stopped AGVs, avoid stopping for cross traffic, and travel minimum distance routes between two given points. A subclass of AGVs includes autonomous self guided vehicles which have sophisticated on board controls and computers, which allow these vehicles to be free ranging.

The flexible route to be taken by the autonomous vehicles can be so designated by several methods. One such method incorporates bar codes in conjunction with lasers that scan the bar codes. The vehicles contain a laser which scans bar codes contained on objects designated as reference points and thereby determines their location relative the object. The corresponding route to reach a destination can be calculated by a computer. The vehicles may be any of a wide variety of different types, but one such vehicle is that known as a "Self-Guided Vehicle" (SGV) from Caterpillar Industrial Inc.

Additional systems are also available which use still other means of achieving autonomous guidance that may be suitable for a given application. Such systems may utilize sonar, infra-red vision, ultrasound, electromagnetics, dead-reckoning utilizing encoders, grid-calibration, transponders and on-board cameras. Suppliers for these systems include Cybermotion, Denning Mobile Robotics, Inc., Flexible Manufacturing Systems, Inc. and Frog Systems, Inc.

An industrial truck is usually not well suited for use in loading/unloading materials onto and off of autonomous AGVs. Autonomous AGVs are inherently expensive and often contain fragile computerized control equipment and sensors which render the vehicles particularly vulnerable to damage from industrial trucks. Therefore, materials are usually loaded onto and removed from autonomous AGVs at fixed load/unload conveyor stations.

Accordingly, it would be desirable to provide a portable docking apparatus as an alternative interface to the large scale material handling trucks whereby material can be safely loaded and unloaded at variable locations and be more conveniently accessible to a greater number of autonomous AGVs.

Portability is desirable in order to free up the floor area when loading/unloading is not needed in that particular location. Relatively few portable load/unload modules would be needed since these modules would be efficiently used. The autonomous AGVs would travel shorter distances overall when loaded, and would travel loaded a significantly greater percentage of time. Therefore, a portable docking apparatus would minimize idle facilities and reduce resulting capital investments.

These portable modules would need to be sturdy and capable of withstanding heavy impacting by large trucks and the like. There also needs to be a coordinated sensory system through which the autonomous AGVs are able to locate a module which is portable and, therefore, does not have a fixed location. Since the docking module is intended for use with the manned industrial trucks it is likely that trucks will collide with the module and occasionally alter its position. The autonomous AGVs need to be able to locate a docking module that has had its position altered slightly through the impact force of a truck while loading or unloading material. Therefore, it is important that the AGVs locate the docking module by detecting its position and not by relying on where the module should be stationed.

The current invention overcomes one or more of the foregoing problems and accomplishes one or more of the aforementioned objectives.

SUMMARY OF THE INVENTION

It is an object of the present invention to provide a warehouse material handling automation system comprising at least one autonomous automatic guided vehicle for transporting material having a means for determining its position with reference to a destination and a means for transmitting its position at frequent time intervals. The automation system would further comprise at least one portable load/unload module with which the vehicle can align having a means for receiving and transferring material from the unmanned vehicle to, for example, a manned industrial material handling truck. Further, it is an object of the present invention to provide means for determining the position of the vehicle, means for determining the position of the module at frequent time intervals, means for determining a route in order for the vehicle to expeditiously reach the module, and means for controlling the vehicle to cause it to move in a designated route.

In an exemplary embodiment of the invention, the means for determining the vehicle's position relative a destination comprises bar code targets affixed to the destination, a scanner on the vehicle for scanning the bar code targets, and a computer on the vehicle for triangulating the vehicle's position relative to a stored path program.

Additional details of the exemplary embodiment may advantageously include the module of the material handling automation system further comprising a platform area having a relatively flat top surface and an electrically powered conveyor thereon corresponding in height to the top surface of the vehicle and synchronized with a conveyor on the vehicle.

In a highly preferred embodiment, the module comprises means for sensing the proximity of the vehicle; a radio frequency transmitter for transmitting the position of the module relative the vehicle; means for providing electrical power; an elongated member extending upwards from the base; a bar code target at or near the top of the elongated member; a scanning device at or near the top of the elongated member; a radio frequency antenna extending past the top of the elongated member; means for controlling the operation of the conveyor; and means for transporting the module.

In one particularly advantageous application, this invention can be used as a system for automating the transportation of rolls of paper in a printing plant. The system may include at least one autonomous automatic guided vehicle having a platform with a relatively flat surface for carrying rolls of paper. It may also include means for calculating the position of the vehicle with reference to a destination. The system may further include means for transmitting the position of the vehicle at frequent time intervals. Additionally, the system may include at least one portable loading/unloading module with which the vehicle can dock for transferring the rolls of paper to and/or from the module.

As for the module, it may suitably comprise a platform of the same height as the platform on the vehicle and a relatively flat surface for carrying rolls of paper. An electrically powered conveyor will be provided on the relatively flat surface of the vehicle and a corresponding electrically powered conveyor will be provided on the relatively flat surface of the module for transferring material from the module to the vehicle, and/or vice versa. Still further, the system will include a local computer resident in the vehicle and/or module for controlling relative movement between the vehicle and the module as the vehicle approaches, docks with, and leaves the module.

With regard to the central computer, it will suitably include means for receiving the instantaneous position of the vehicle. Means will also be provided for determining the position of the module at frequent time intervals as well as means for determining a route in order for the vehicle to reach the module. In addition, the central computer will include means for controlling the vehicle to move in the route so determined.

Another aspect of the present invention involves providing a portable module for transferring materials between an autonomous automatic guided vehicle and an industrial truck. The module comprises a platform having a relatively flat surface approximating the height of a surface on a corresponding platform of an autonomous automatic guided vehicle and means is provided for sensing the proximity of an approaching vehicle to facilitate docking. Also, means is provided for transmitting the position of the module relative to the vehicle.

Additional details of the docking module include a bi-directional electrically powered conveyor on the flat surface of the platform similar to a bi-directional conveyor on the autonomous automatic guided vehicle. The docking module may also include means for transmitting information on whether it is carrying material, for instance, in the form of a radio frequency transceiver and antenna and a computer for processing the information on the position of the module relative to the vehicle. Further, the docking module may include a radio frequency receiver/transmitter, a rotating scanning device, and targets for the vehicle.

The module may still further comprise an elongated member extending perpendicular to the base at one corner thereof. The base advantageously contains targets and/or sensors for use by the autonomous automatic guided vehicle to align properly for docking on each of its sides and a rotating laser scanner is suitably positioned at the top of the elongated member. Additionally, a radio frequency transceiver and antenna may be attached at one corner of the elongated member to extend past the top thereof. Alternatively, the location of the module may be determined by a rotating sonar beacon, a rotating camera, an infra-red beacon or any other suitable method.

Still additional details of the module may comprise recesses in the base of the module for allowing a fork lift to engage the base for movement of the module together with a platform that contains concave surfaces on two edges of the platform for transport by a clamp truck.

Other objects, advantages and features of the present invention will become apparent from a consideration of the following specification taken in conjunction with the accompanying drawings.

BEST MODE FOR CARRYING OUT THE INVENTION

Figure 1:
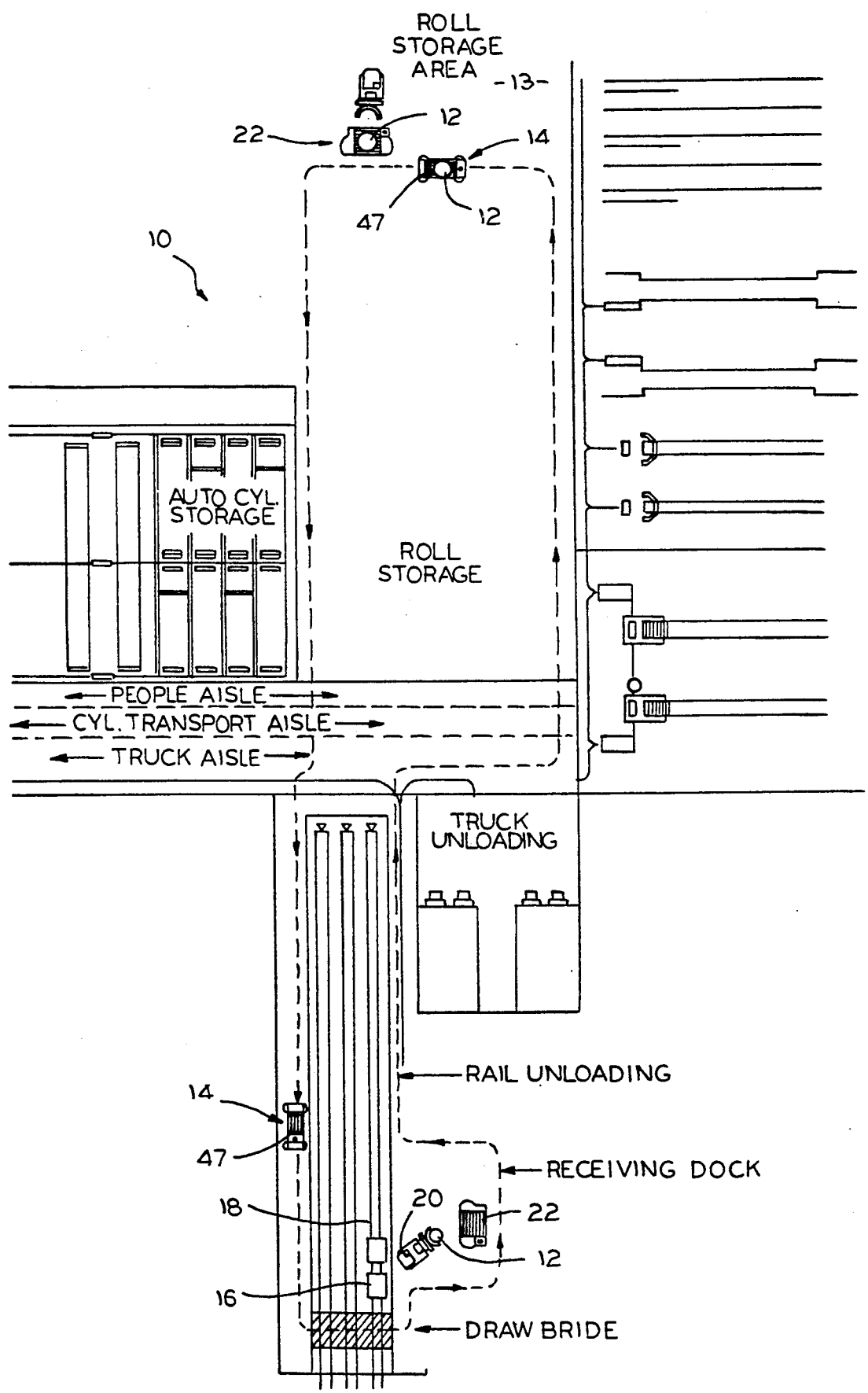
FIG. 1 is a largely schematic plan view of an automated plant incorporating AGVs which uses portable docking modules as contemplated by this invention.

Referring to the drawings, and first to FIG. 1, a typical printing plant generally designated is shown wherein paper rolls 12 are transported to and/or from various areas. In the illustrated application, the press rolls 12 are transported relative a roll storage area 13 by means of autonomous automatic guided vehicles (AGVs) 14. However, as will be appreciated, this is only one example of the type of manufacturing plant in which this material handling automation method can be implemented.

AGVs comprise a large class of unmanned industrial vehicles which vary in degree of sophistication, and autonomous AGVs are one class of such vehicles with sophisticated controls, and often on-board computers, which enable them to be free ranging. Autonomous AGVs can be capable of turning around, taking short cuts and optimizing the shortest path between two pick up/deliver stations. Autonomous AGVs are currently marketed by Cybermotion, Denning Mobile Robotics, Inc., Flexible Manufacturing Systems, Inc., Caterpillar Industrial, Inc., and NDC Automation, Inc. has developed navigational and sophisticated controls therefor.

In FIG. 1, the rolls of paper 12 enter the general area of the printing press plant 10 by means of railroad cars 16 on tracks 18 adjacent the plant area. As is known, the railroad cars 16 will transport materials to the plant and may also be used for transporting the final product manufactured out of the plant area.

Material handling trucks such as manned roll grab trucks 20 are used in unloading the rolls of paper 12 from the railroad cars 16 and, at the other end of the plant area, roll grab trucks 20 are also used in moving the rolls of paper 12 from the plant receiving area into the roll storage area 13. In this connection, it is economically advantageous to be able to automate the process of transporting the paper rolls 12 from the railroad cars 16 to the roll storage area 13 rather than to simply rely upon the use of roll grab trucks 20.

After the rolls of paper 12 are brought off the railroad cars 16, it is necessary to distribute the rolls among various storage and/or manufacturing areas throughout the plant area. In FIG. 1, this process has been automated through the use of autonomous AGVs 14 in conjunction with portable AGV loading/unloading or docking modules 22. Materials would not be directly loaded/unloaded by trucks onto/off of AGVs since AGVs are expensive and could be damaged, and materials are also not unloaded onto fixed conveyor stations, since there are advantages in using a portable docking module.

The portable modules 22 eliminate the need of using floor space for fixed location load/unload stations which all too often sit idle. Fewer load/unload conveyors are necessary since the portable modules 22 can be shuttled between locations as needed. The portable modules 22 also greatly improve the utilization of autonomous AGVs 14. Each AGV 14 can thereby travel a shorter distance overall when loaded, and travel loaded a significantly greater percentage of time. Therefore, portability of load/unload modules 22 results in space saving as well as capital equipment savings.

Figure 2:
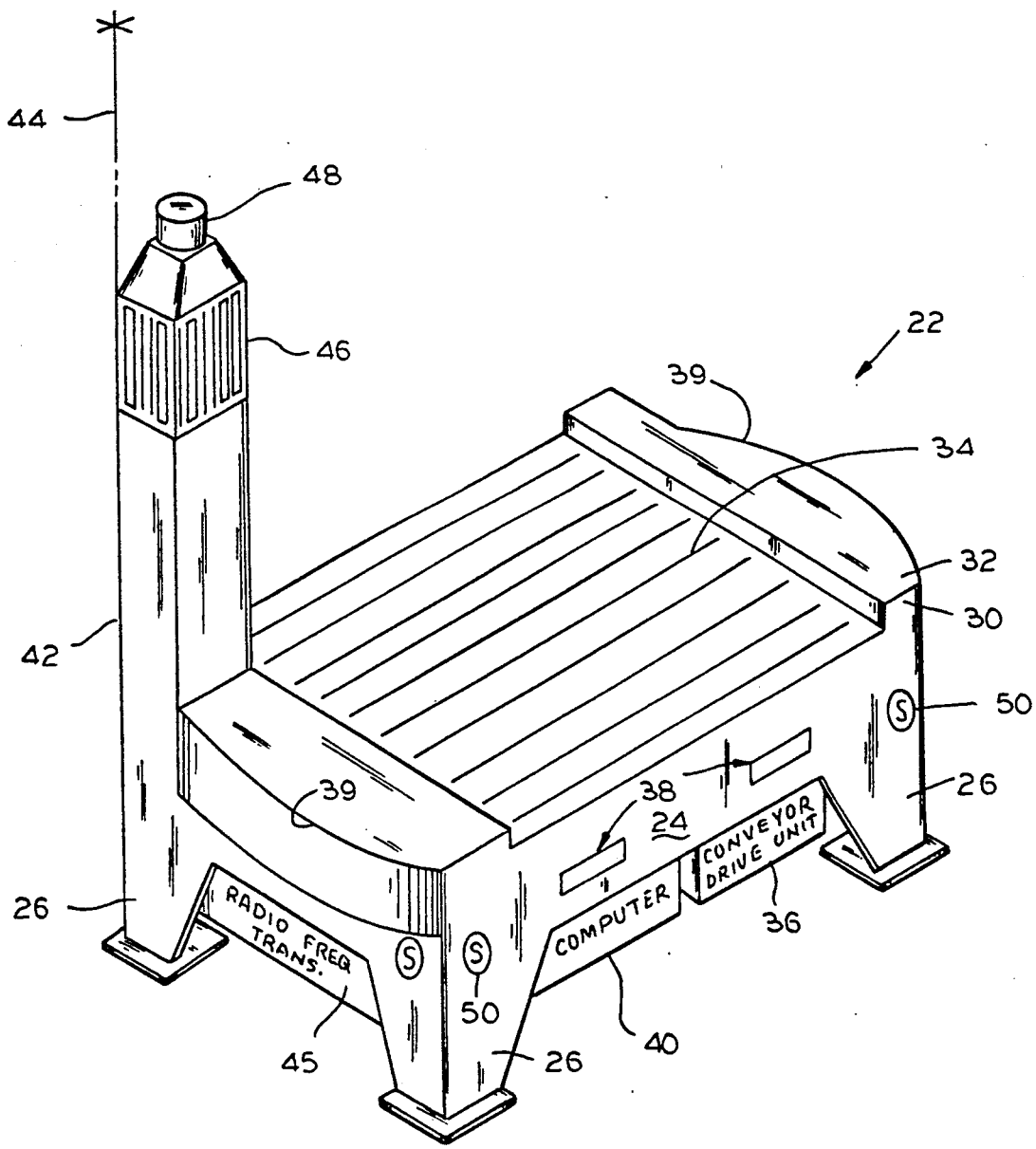
FIG. 2 is a perspective view of a docking module as contemplated by this invention.

Referring to FIG. 2, an AGV loading/unloading module 22 is shown which comprises a base 24 supported by four legs 26. As will be appreciated, platform 30 is defined by the top of the base 24. For apparent reasons, the height of the top surface 32 of the platform 30 will correspond to the height of the top surface of a corresponding platform on the AGVs 14.

Still referring to FIG. 2, the top surface 32 of the platform 30 has an electrically driven conveyor 34 which is synchronized with a corresponding conveyor surface on the AGVs 14. In that way materials such as rolls of paper 12 can be transferred between a vehicle 14 and a module 22 by, for instance, driving the rolls off of the conveyor 34 of a module 22 by means of electrically driven movement of the conveyor 34 and receiving the rolls onto the conveyor of an AGV.

As will be appreciated, the conveyor 34 is suitably controlled by means of a control unit 36 located under the base 24 of the platform 30. The powered conveyor 34 in this example may be a belt, powered rollers, or any other conveying means. As is well known to those skilled in the art, there are also still other suitable methods for transferring a load between an AGV and a module.

As seen in FIG. 2, the base 24 of the module 22 contains slots 38 with which the prongs of a forklift can be engaged. In that way the module 22 can be moved by means of a manned industrial fork lift into a position for docking with a vehicle 14 when needed for that purpose. Also the shape of the base 24 may be specially designed with curved edges 39 to aid in moving the module 22 by means of a roll grab truck 20.

Figure 3:
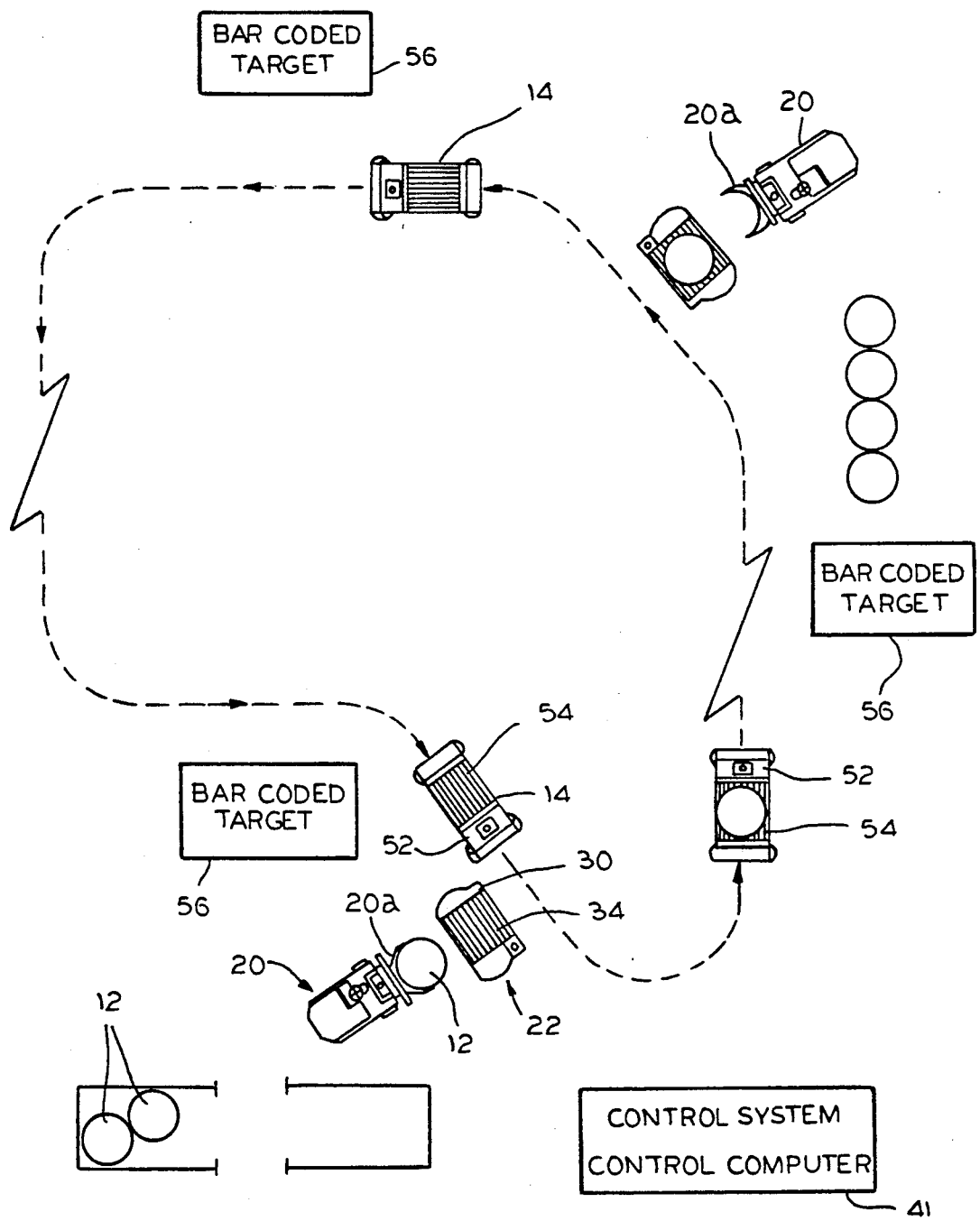
FIG. 3 is a schematic diagram of the use of the docking modules in relation to AGVs and manned material handling trucks.

Modules with curved edges 39 are particularly advantageous for use in paper roll warehouses or printing plants 10 where rolls of paper 12 are handled by manned industrial trucks 20 having specially designed roll grab clamps 20a attached to the masts of the trucks rather than having the more common forks (see FIG. 3). In a warehouse or plant having such trucks 20, the clamps 20a could be used to pick up and move a module 22 having curved edges 39 safely, without damaging the module, and the modules 22 can also be moved by a variety of other methods well known in the art, such as engagement of the slots 38 by a traditional forklift.

As mentioned previously, mobility of these modules 22 is advantageous in facilitating the efficient operation of the autonomous AGVs 14. Less equipment is needed for loading/unloading materials since the modules 22 can be moved to locations where they are currently needed and, consequently, there is less time when a load/unload module is unused. This system is also more efficient for the AGVs which do not have to travel extra distances to reach a conveyor module. Non-use of a module 22 would only occur during relatively low plant activity periods.

Also contained under the base 24 of the module 22 is a computerized system 40 which performs the multiple functions of controlling the operation of the module 22, calculating the distance of the module 22 from a designated vehicle 14, and reporting its location to the central system control computer 41.

Referring specifically to FIG. 2, located at one corner at the top of the platform 30 is a generally rectangularly shaped elongated member such as a pole 42 which has a radio antenna 44 extending from the top of the pole for transmitting information on the location of the module 22 from a radio frequency transmitter 45 and bar codes 46 that can be scanned by lasers 47 on the autonomous AGVs 14 (See, also, FIG. 1). The data generated can be used in calculating the distance of the vehicles 14 from the modules 22 plus the relative location of both units, and the module 22 also has a laser scanner 48 which is located at or near the top of the pole 42 for use in determining its exact position. As is well known to those skilled in the art, there are many other methods for determining the relative positions of an AGV 14 and a module 22 in addition to laser scanners, e.g., currently available technology includes sonar, vision, ultrasound, infrared, electromagnetics, dead reckoning, on-board optical transponders, optical encoders, gyroscopes, grid calibration, and on-board cameras.

Referring to FIG. 3, the operation of the automated system contemplates the utilization of manned roll grab trucks 20 that deposit rolls of paper 12 onto AGV docking modules 22. It will be appreciated that this can cause the modules 22 to easily be jostled and their position slightly altered. Therefore, it is important that the autonomous AGVs 14 have the ability to accurately locate and align with the modules 22 irrespective of a predetermined location.

An autonomous AGV 14 that is not otherwise in use is routed to the location of a loaded docking module 22 and uses a laser 47 to scan a bar code target 46 located on the module 22 to serve as a position indicating signal for positively identifying a particular module plus its relative location and calculating the distance to the module 22. The autonomous AGV 14 continually calculates its proximity to the module 22 to ultimately locate the module 22, and the information on the respective locations of the autonomous AGV 14 and the module 22 is coordinated by the central system control computer 41 to calculate the movements to be made by the autonomous AGV 14 in order to reach the module 22. Routing is determined by the central system computer which first determines minimal travel distance routing for an assigned transport task and then selects an optimum route which avoids traffic delays caused by meeting other AGVs at aisle intersections or having to stop and wait behind a non-moving AGV involved in a load/unload transaction.

As is known in the art, this may all be accomplished by triangulating the position of the AGV 14. This may be done responsive to laser scanning at least one bar code 46 affixed to the module 22 and at least two bar coded targets 56 at fixed points independent of the AGV 14 and the module 22 (see FIG. 3). Of course, it will be appreciated that there are many other suitable methods for location determination and navigation as is well known to those skilled in the art.

Once the module 22 is located, the autonomous AGV 14 uses sensors 50 located on the module 22 to precisely determine the exact position of the module 22. Sensors may additionally or alternatively be located on the autonomous AGV 14 to assist in docking maneuvers and, in either case, the autonomous AGV 14 can thus be aligned with the module 22 for the transference of the rolls of paper 12 from the module 22 onto the autonomous AGV 14, or vice versa. One example of a system having sophisticated docking maneuverability is an AGV marketed by Cybermotion, Inc. which includes what is called a "docking beacon."

The autonomous AGV 14 moves next to the platform 30 on the module 22. When this occurs, the platforms 30 and 52, respectively, of the module 22 and autonomous AGV 14, which are of the same height, are aligned and docked. The rolls of paper 12 can then be removed from the module 22 and taken up onto the autonomous AGV 14 through the movements of the conveyors 34 and 54, respectively, of the module 22 and the autonomous AGV 14, or vice versa since the platform 52 on the autonomous AGV 14 is aligned along the adjacent side of the platform 30 on the module 22. When conveyors 34 and 54 on both the module 22 and docked autonomous AGV 14 are simultaneously activated, they run in the same direction, moving the roll 12 from the module 22 to the autonomous AGV 14 or vice versa. As is well known, there are still other methods that can be used to transfer materials.

The process of moving a roll of paper 12 from the receiving area to the roll storage area 13 and unloading it onto a module 22 is the reverse of the preceding. The roll of paper 12 is carried by one of the autonomous AGVs 14 which locates a designated module 22 as determined by the central computer. The autonomous AGV 14 and module 22 become properly aligned. The conveyor 54 of the AGV 14 moves the roll of paper 12 toward the module 22 and the conveyor 34 of the module 22 moves the roll of paper 12 onto the module 22. A manually driven roll grab truck 20 then removes the roll of paper 12 from the module 22, and stacks it in the storage area 13.

The module 22 can be placed in a trucking aisle near a selected lot storage area 13. This module would be lot loaded or unloaded, and then moved to its next assigned load/unload area. In that arrangement, no storage space would be needed for the module 22.

Additionally a manned roll grab truck 20 could work in conjunction with its own (captive) load/unload module 22, which it would carry with it from one area where it had a work assignment to another.

The foregoing disclosure and specific embodiments are merely illustrative of the broad inventive concepts comprehended by the invention as defined by the appended claims.

I claim:

1. A portable material handling module for transferring materials between an automatic guided vehicle which is not preprogrammed to follow a predetermined route and a truck, said module comprising:

a platform having a top surface approximating the height of a top surface of a corresponding platform on said automatic guided vehicle; and means for transmitting a signal indicative of an exact position of said module for assisting said automatic guided vehicle in being directed to travel along a route in real time for alignment of said vehicle with said module located at or near any selected destination irrespective of any predetermined module location.

2. The module as in claim 1 wherein said module further comprises an electrically powered conveyor on said top surface of said platform, said automatic guided vehicle also having a conveyor on a top surface or a corresponding platform for transferring materials between said module and said automatic guided vehicle.

3. The module as in claim 1 wherein said module further comprises means for transmitting information on whether said module is carrying material.

4. The module as in claim 3 wherein said means for transmitting information comprises a radio frequency transceiver and antenna.

5. The module as in claim 1 wherein said module further comprises at least one target for identification by a scanning device on said automatic guided vehicle.

6. The module as in claim 1 further comprising means for sensing the proximity of an approaching automatic guided vehicle to facilitate docking.

7. A portable module for transferring materials between an automatic guided vehicle and a truck, said module comprising:

a platform having a top surface approximating the height of a top surface of a corresponding platform on said automatic guided vehicle; and means for transmitting a signal indicative of an exact position of said module for assisting said automatic guided vehicle in travelling along a route to said module at any selected destination;

said module further comprising a computer for processing information on said exact position of said module at said selected destination and said module still further comprising a radio frequency receiver/transmitter for transmitting said signal indicative of said exact position of said module at said selected destination to and receiving a signal from a central system control computer.

8. A portable module for transferring material between an automatic guided vehicle and a truck, said module comprising:

a platform having a top surface approximating the height of a top surface of a corresponding platform on said automatic guided vehicle; and means for transmitting a signal indicative of an exact position of said module for assisting said automatic guided vehicle in travelling along a route to said module at any selected destination;

said module further comprising a rotating scanning device.

9. A portable module for transferring material between an automatic guided vehicle and a truck, said module comprising:

a platform having a top surface approximating the height of a top surface of a corresponding platform on said automatic guided vehicle; and means for transmitting a signal indicative of an exact position of said module for assisting said automatic guided vehicle in travelling along a route to said module at any selected destination;

said module further comprising an elongated member extending upwards from said platform of said module, said elongated member having at least one target for identification by a scanning device on said automatic guided vehicle at or near the top thereof, said elongated member also having a rotating scanning device at or near the top thereof, and a radio frequency antenna attached to and extending past the top of said elongated member.

10. A portable module for transferring material between an automatic guided vehicle and a truck, said module comprising:

a platform having a top surface approximating the height of a top surface of a corresponding platform on said automatic guided vehicle; and means for transmitting a signal indicative of an exact position of said module for assisting said automatic guided vehicle in travelling along a route to said module at any selected destination;

said module further comprising a base having means for accommodating engagement by a fork lift truck for transportation of said module.

11. The module as in claim 10 wherein said engagement accommodating means comprises recesses in said base for receiving protruding forks of said fork lift truck.

12. A portable module for transferring material between an automatic guided vehicle and a truck, said module comprising:

a platform having a top surface approximating the height of a top surface of a corresponding platform on said automatic guided vehicle; and means for transmitting a signal indicative of an exact position of said module for assisting said automatic guided vehicle in travelling along a route to said module at any selected destination;

said platform having a concave surface on at least two opposite sides of said platform for engagement by a roll grab truck for transportation of said module.

13. A material handling automation system comprising:

at least one automatic guided vehicle for transporting material which is not preprogrammed to follow a predetermined route;

means for determining a position of said vehicle relative to any selected destination;

at least one portable material handling module at or near said selected destination with which said vehicle can align irrespective of any predetermined module location;

means for determining an exact position for said module at or near said selected destination at least at frequent time intervals;

means for determining a route for said vehicle to travel and directing said vehicle to said exact position for said module in real time for alignment of said vehicle with said module at or near said selected destination;

means for controlling said automatic guided vehicle to move on said route; and means for transferring material between said module and said vehicle when said vehicle is aligned with said module at said exact position.

14. The material handling automation system as in claim 13 further comprising means for transmitting signals between said vehicle and said selected destination at least at frequent time intervals, said signal transmitting means including a scanner on said vehicle and said vehicle position determining means including a computer on said vehicle, said computer triangulating said position of said vehicle responsive to said laser scanning at least one bar code affixed to said module and at least two bar coded targets at fixed points independent of said vehicle and said module.

15. The material handling automation system as in claim 13 wherein said vehicle and said module have cooperative means for sensing alignment at said destination.

16. The material handling automation system as in claim 13 wherein said vehicle further comprises a platform having a powered conveyor on a top surface thereof.

17. The material handling automation system as in claim 16 wherein said module further comprises a platform having a powered conveyor on a top surface thereof, said conveyor of said module corresponding in height and being synchronized with said conveyor on said vehicle.

18. The material handling automation system as in claim 17 wherein said powered conveyors are bi-directional.

19. A material handling automation system comprising:

at least one automatic guided vehicle for transporting material;

means for determining a position of said vehicle relative to any selected destination;

at least one portable module with which said vehicle can align at said selected destination;

means for determining an exact position for said module at said selected destination at least at frequent time intervals;

means for determining a route for said vehicle to travel to said exact position for said module for alignment at said selected destination;

means for controlling said automatic guided vehicle to move on said route; and means for transferring material between said module and said vehicle when said vehicle is aligned with said module at said selected destination;

said vehicle further comprising a platform having a powered conveyor on a top surface thereof, said module further comprising a platform having a powered conveyor on a top surface thereof, said conveyor on said module corresponding in height and being synchronized with said conveyor on said vehicle;

said module position determining means including a radio frequency transmitter and said module further comprises:

means for sensing proximity of said vehicle to said module;

means for transporting said module from said selected destination to a new destination; and means for transmitting a signal indicative of position.

20. The material handling automation system as in claim 19 wherein said module further comprises an elongated member extending upwards from said platform of said module, at least one bar code target at or near the top of said elongated member, a rotating laser scanner at or near the top of said elongated member and a radio frequency antenna attached to and extending past the top of said elongated member.

21. A system for automating the transportation of rolls of paper in a printing plant comprising:

at least one automatic guided vehicle which is not preprogrammed to follow a predetermined route, said vehicle having a platform with a top surface for carrying rolls of paper and having means for determining a position of said vehicle relative to any selected destination, said vehicle further having means for transmitting said position of said vehicle by signal at frequent time intervals;

at least one portable material handling module at or near said selected destination with which said vehicle can align irrespective of any predetermined module location, said module having a platform with a top surface at the same height as said top surface of said platform on said vehicle, said top surface of said platform on said module also being aligned for carrying rolls of paper;

an electrically powered conveyor on said top surface of said vehicle and a corresponding electrically powered conveyor on said top surface of said module for transferring material between said module and said vehicle;

means for receiving said signal from said vehicle for determining an exact position of said vehicle;

means for determining said exact position for said module at said selected destination at frequent time intervals;

means for determining a route for said vehicle and directing said vehicle to travel to said exact position for said module in real time for alignment of said vehicle with said module at said selected destination; and means for controlling said vehicle to move on said route.

* * * * *